United States Patent
Schwabel et al.

(10) Patent No.: US 9,573,250 B2
(45) Date of Patent: Feb. 21, 2017

(54) CERAMIC SHAPED ABRASIVE PARTICLES, METHODS OF MAKING THE SAME, AND ABRASIVE ARTICLES CONTAINING THE SAME

(75) Inventors: Mark G. Schwabel, Lake Elmo, MN (US); Maiken Givot, St. Paul, MN (US); Negus B. Adefris, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 366 days.

(21) Appl. No.: 13/581,844

(22) PCT Filed: Apr. 20, 2011

(86) PCT No.: PCT/US2011/033188
§ 371 (c)(1),
(2), (4) Date: Aug. 30, 2012

(87) PCT Pub. No.: WO2011/139562
PCT Pub. Date: Nov. 10, 2011

(65) Prior Publication Data
US 2013/0040537 A1    Feb. 14, 2013

Related U.S. Application Data

(60) Provisional application No. 61/328,482, filed on Apr. 27, 2010.

(51) Int. Cl.
*B24D 5/04*    (2006.01)
*B24D 5/12*    (2006.01)
(Continued)

(52) U.S. Cl.
CPC . *B24D 5/12* (2013.01); *B24D 5/04* (2013.01); *B24D 7/04* (2013.01); *C09K 3/1409* (2013.01)

(58) Field of Classification Search
CPC ............... B24D 5/04; B24D 7/04; B24D 5/12; B24D 11/001; B24D 11/005; B24D 18/0054; C09K 3/1409
(Continued)

(56) References Cited

U.S. PATENT DOCUMENTS

| 1,910,444 A | 5/1933 | Nicholson |
| 3,041,156 A | 6/1962 | Rowse et al. |

(Continued)

FOREIGN PATENT DOCUMENTS

| CN | 88100534 | 12/1988 |
| CN | 2757922 Y | 2/2006 |

(Continued)

OTHER PUBLICATIONS

International Search Report, PCT/US2011/033188, mailed Dec. 13, 2011, 4 pages.
(Continued)

*Primary Examiner* — Joseph J Hail
*Assistant Examiner* — Joel Crandall
(74) *Attorney, Agent, or Firm* — Bradford B. Wright (57) ABSTRACT

Ceramic shaped abrasive particles have four major sides joined by six common edges. Each one of the four major sides contacts three other of the four major sides. The six common edges have substantially the same length. Methods of making the ceramic shaped particle are disclosed. The ceramic shaped abrasive particles are useful for abrading a surface of a workpiece. An abrasive article includes the ceramic shaped abrasive particles retained in a binder.

13 Claims, 2 Drawing Sheets (51) Int. Cl.
  *B24D 7/04* (2006.01)
  *C09K 3/14* (2006.01)
(58) Field of Classification Search
  USPC .......................... 451/548, 28; 51/298, 307
  See application file for complete search history.

(56) References Cited

U.S. PATENT DOCUMENTS

| | | | |
|---|---|---|---|
| 3,454,385 A * | 7/1969 | Amero ................ C09K 3/1418 | |
| | | | 501/103 |
| 3,549,341 A * | 12/1970 | Langlois et al. ................ 51/293 | |
| 3,808,747 A * | 5/1974 | Kenagy .......................... 451/330 | |
| 3,859,407 A | 1/1975 | Blanding et al. | |
| 4,261,706 A * | 4/1981 | Blanding et al. ............... 51/295 | |
| 4,314,827 A | 2/1982 | Leitheiser | |
| 4,623,364 A | 11/1986 | Cottringer et al. | |
| 4,652,275 A | 3/1987 | Bloecher et al. | |
| 4,744,802 A | 5/1988 | Schwabel | |
| 4,770,671 A | 9/1988 | Monroe et al. | |
| 4,799,939 A | 1/1989 | Bloecher et al. | |
| 4,881,951 A | 11/1989 | Monroe | |
| 4,992,082 A * | 2/1991 | Drawl et al. ..................... 51/295 | |
| 4,997,461 A | 3/1991 | Markhoff-Matheny et al. | |
| 5,009,675 A | 4/1991 | Kunz et al. | |
| 5,011,508 A | 4/1991 | Wald et al. | |
| 5,042,991 A | 8/1991 | Kunz et al. | |
| 5,085,671 A | 2/1992 | Martin et al. | |
| 5,152,917 A | 10/1992 | Pieper et al. | |
| 5,164,348 A | 11/1992 | Wood | |
| 5,201,916 A | 4/1993 | Berg et al. | |
| 5,213,591 A | 5/1993 | Celikkaya et al. | |
| 5,352,254 A | 10/1994 | Celikkaya | |
| 5,366,523 A | 11/1994 | Rowenhorst et al. | |
| 5,435,816 A | 7/1995 | Spurgeon et al. | |
| 5,453,106 A * | 9/1995 | Roberts ............................ 51/307 | |
| 5,500,273 A * | 3/1996 | Holmes et al. ............... 428/147 | |
| 5,551,963 A | 9/1996 | Larmie | |
| 5,560,745 A | 10/1996 | Roberts | |
| RE35,570 E | 7/1997 | Rowenhorst et al. | |
| 5,672,097 A | 9/1997 | Hoopman et al. | |
| 5,690,705 A | 11/1997 | Holmes et al. | |
| 5,876,470 A | 3/1999 | Abrahamson | |
| 5,946,991 A | 9/1999 | Hoopman et al. | |
| 5,975,987 A | 11/1999 | Hoopman et al. | |
| 5,984,988 A | 11/1999 | Berg et al. | |
| 6,019,805 A | 2/2000 | Herron | |
| 6,050,691 A * | 4/2000 | Fellows et al. ............... 359/529 | |
| 6,054,093 A | 4/2000 | Torre et al. | |
| 6,086,648 A * | 7/2000 | Rossetti, Jr. ............. B24D 3/18 | |
| | | | 451/28 |
| 6,129,540 A | 10/2000 | Hoopman et al. | |
| 6,277,161 B1 | 8/2001 | Castro et al. | |
| 6,769,975 B2 * | 8/2004 | Sagawa ......................... 451/541 | |
| 6,821,196 B2 * | 11/2004 | Oliver ........................... 451/546 | |
| 6,945,857 B1 * | 9/2005 | Doan et al. ..................... 451/56 | |
| 7,410,413 B2 | 8/2008 | Woo | |
| 7,540,802 B2 | 6/2009 | Nonoshita | |
| 8,123,828 B2 | 2/2012 | Culler et al. | |
| 8,142,531 B2 | 3/2012 | Adefris et al. | |
| 8,142,532 B2 | 3/2012 | Erickson et al. | |
| 8,142,891 B2 | 3/2012 | Culler et al. | |
| 8,367,198 B2 * | 2/2013 | Wickert et al. ............... 428/323 | |
| 2002/0026752 A1 | 3/2002 | Culler et al. | |
| 2004/0018802 A1 | 1/2004 | Welygan | |
| 2004/0235301 A1 | 11/2004 | Wada | |
| 2005/0255801 A1 * | 11/2005 | Pollasky ........................ 451/527 | |
| 2009/0038234 A1 * | 2/2009 | Yen ................... 51/295 | |
| 2009/0169816 A1 | 7/2009 | Erickson et al. | |
| 2009/0215366 A1 * | 8/2009 | Ishizuka ........................ 451/443 | |
| 2010/0130104 A1 * | 5/2010 | Everts et al. ..................... 451/28 | |
| 2010/0146867 A1 | 6/2010 | Boden et al. | |
| 2010/0151201 A1 * | 6/2010 | Erickson et al. ............. 428/148 | |
| 2010/0266847 A1 | 10/2010 | Wickert et al. | |
| 2010/0319269 A1 | 12/2010 | Erickson | |
| 2011/0081830 A1 * | 4/2011 | Pollasky ........................... 451/28 | |
| 2011/0146509 A1 | 6/2011 | Welygan et al. | |
| 2011/0296767 A1 | 12/2011 | Lee et al. | |
| 2012/0137597 A1 | 6/2012 | Adefris et al. | |
| 2012/0144754 A1 | 6/2012 | Culler et al. | |
| 2012/0144755 A1 | 6/2012 | Erickson et al. | |
| 2012/0227333 A1 * | 9/2012 | Adefris et al. ................... 51/309 | |
| 2012/0231711 A1 | 9/2012 | Keipert et al. | |

FOREIGN PATENT DOCUMENTS

| | | |
|---|---|---|
| CN | 1901973 | 1/2007 |
| EA | 001843 | 8/2001 |
| EP | 0 318 168 | 5/1989 |
| GB | 986847 | 3/1965 |
| JP | H05-10335 A | 1/1993 |
| JP | H07-509508 | 10/1995 |
| JP | 2007-537892 | 12/2007 |
| JP | 2008-049428 | 3/2008 |
| RU | 2303621 | 7/2007 |
| WO | WO 94/02559 A1 | 2/1994 |
| WO | WO 99/46077 | 9/1999 |
| WO | WO 01/87396 A1 | 11/2001 |
| WO | WO 2005/035196 | 4/2005 |
| WO | WO 2005/051490 A2 | 6/2005 |
| WO | WO 2005/113197 A2 | 12/2005 |
| WO | WO 2011/068714 A2 | 6/2011 |
| WO | WO 2011/109188 A2 | 9/2011 |

OTHER PUBLICATIONS

Saint-Gobain Staff, Investigation of Shaped Abrasive Particles vol. 1: Review of U.S. Pat. No. 6,054,093, Apr. 25, 2000, 5 pages.
Givot et al., U.S. Appl. No. 13/579,533, entitled "Bonded Abrasive Wheel", filed Feb. 22, 2011.
Uematsu, et al., "Grinding Characteristics of Tetrahedral cBN Abrasive", ($3^{rd}$ Report: Grinding Characteristics fo Trued Electropated cBN Wheel), The Collection of ABTEC 1998, Japan, 1998, pp. 62-65.

* cited by examiner

CERAMIC SHAPED ABRASIVE PARTICLES, METHODS OF MAKING THE SAME, AND ABRASIVE ARTICLES CONTAINING THE SAME

CROSS-REFERENCE TO RELATED APPLICATIONS

This application is a national stage filing under 35 U.S.C. 371 of PCT/US2011/033188, filed Apr. 20, 2011, which claims priority to U.S. Provisional Application No. 61/328,482, filed Apr. 27, 2010, the disclosures of which are incorporated by reference in their entirety herein.

TECHNICAL FIELD

The present disclosure relates to bonded abrasive articles.

BACKGROUND

Bonded abrasive articles have abrasive particles bonded together by a bonding medium. Bonded abrasives include, for example, stones, hones, grinding wheels, and cut-off wheels. The bonding medium is typically an organic resin, but may also be an inorganic material such as a ceramic or glass (i.e., vitreous bonds).

SUMMARY

In one aspect, the present disclosure provides a plurality of ceramic shaped abrasive particles, wherein the ceramic shaped abrasive particles have four major sides joined by six common edges, wherein each one of the four major sides contacts three other of the four major sides, and wherein the six common edges have substantially the same length.

In some embodiments, the ceramic shaped abrasive particles conform to an abrasives industry specified nominal grade. In some embodiments, at least one of the four major sides is substantially planar. In some embodiments, at least one of the four major sides is concave. In some embodiments, the ceramic shaped abrasive particles comprise alpha alumina. In some embodiments, all four of the major sides are concave. In some embodiments, at least one of four major sides is convex. In some embodiments, the ceramic shaped abrasive particles are not shaped as truncated pyramids. In some embodiments, the ceramic shaped abrasive particles have tetrahedral symmetry. In some embodiments, the ceramic shaped abrasive particles are substantially shaped as regular tetrahedrons. In some embodiments, the ceramic shaped abrasive particles comprise sol-gel derived alumina. In some embodiments, the ceramic shaped abrasive particles have a coating of inorganic particles thereon.

Ceramic shaped abrasive particles according to the present disclosure are useful; for example, in manufacture of abrasive articles and for abrading a workpiece.

Accordingly, in another aspect, the present disclosure provides a method of abrading a workpiece, the method comprising: frictionally contacting at least a portion of the ceramic shaped abrasive particles of an abrasive article according to the present disclosure with a surface of a workpiece; and moving at least one of the workpiece or the abrasive article to abrade at least a portion of the surface of the workpiece.

In yet another aspect, the present disclosure provides an abrasive article comprising ceramic shaped abrasive particles according to the present disclosure retained in a binder.

In some embodiments, the binder comprises an organic binder. In some embodiments, the abrasive article comprises a bonded abrasive article. In some embodiments, the binder comprises a phenolic resin. In some embodiments, the binder comprises an inorganic binder. In some embodiments, the binder comprises a vitreous binder.

In some embodiments, the abrasive article comprises a bonded abrasive wheel. In some embodiments, the bonded abrasive wheel comprises a grinding wheel (including, for example, a depressed-center grinding wheel) or a cut-off wheel. In some embodiments, the abrasive article further comprises reinforcing material disposed on opposed major surfaces of the bonded abrasive wheel. In some embodiments, the abrasive article further comprises reinforcing material disposed on only one major surface of the bonded abrasive wheel. In some embodiments, the abrasive article further comprises crushed abrasive particles (e.g., conforming to an abrasives industry specified nominal grade).

In yet another embodiment, the present disclosure provides a method of making an abrasive particle, the method comprising:

introducing a ceramic precursor dispersion into a cavity of a mold, wherein the cavity has three concave walls that meet at a common vertex;

drying the ceramic precursor dispersion and removing it from the cavity to provide a ceramic shaped abrasive particle precursor;

calcining the ceramic shaped abrasive particle precursor; and sintering the calcined ceramic shaped abrasive particle precursor to provide a ceramic shaped abrasive particle, wherein the ceramic shaped abrasive particle has four major sides joined by six common edges, wherein each one of the four major sides contacts three other of the four major sides, wherein at least three of the four major sides are substantially planar, and wherein the six common edges have substantially the same length.

Advantageously, ceramic shaped abrasive particles according to the present disclosure have a high degree of symmetry that reduces the possibility of orientation of the abrasive particles along a given direction (e.g., as a result of manufacturing technique) that may lead to erratic and/or degraded abrading performance.

As used herein:

the term "substantially the same length" in reference to common edges means the common edges have lengths within +/−20 percent of a nominal length;

the term "regular tetrahedron" refers to a tetrahedron having four equal faces; and the term "substantially shaped" in reference to a regular tetrahedron means having a shape of a regular tetrahedron except for minor defects (e.g., as may occur during manufacturing).

The foregoing embodiments may be implemented in any combination thereof, unless such combination is clearly erroneous in view of the teachings of the present disclosure.

Features and advantages of the present disclosure will be understood upon consideration of the detailed description as well as the appended claims. The Figures and the detailed description which follow more particularly exemplify illustrative embodiments.

BRIEF DESCRIPTION OF THE DRAWINGS

FIG. 3A is a schematic perspective view of an exemplary ceramic shaped abrasive particle 20a;

While the above-identified drawing figures set forth several embodiments of the present disclosure, other embodiments are also contemplated, as noted in the discussion. In all cases, this disclosure presents the disclosure by way of representation and not limitation. It should be understood that numerous other modifications and embodiments can be devised by those skilled in the art, which fall within the scope and spirit of the principles of the disclosure. The figures may not be drawn to scale. Like reference numbers may have been used throughout the figures to denote like parts.

DETAILED DESCRIPTION

Figure 1:
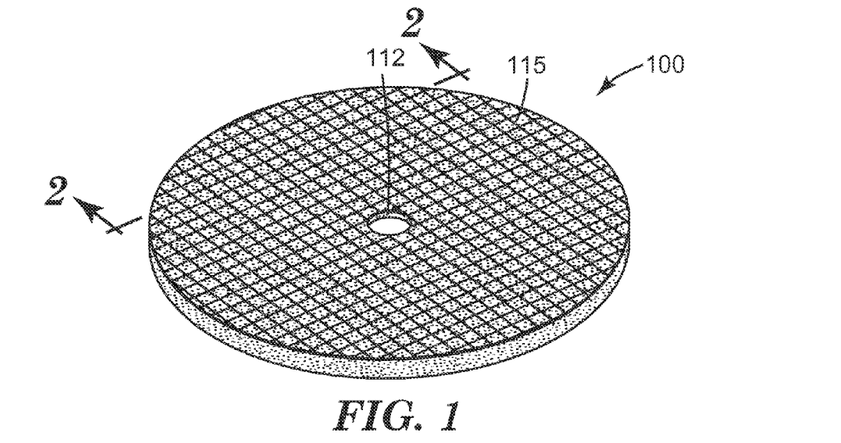
FIG. 1 is a perspective view of an exemplary bonded abrasive wheel 100 according to one embodiment of the present disclosure.
Figure 2:
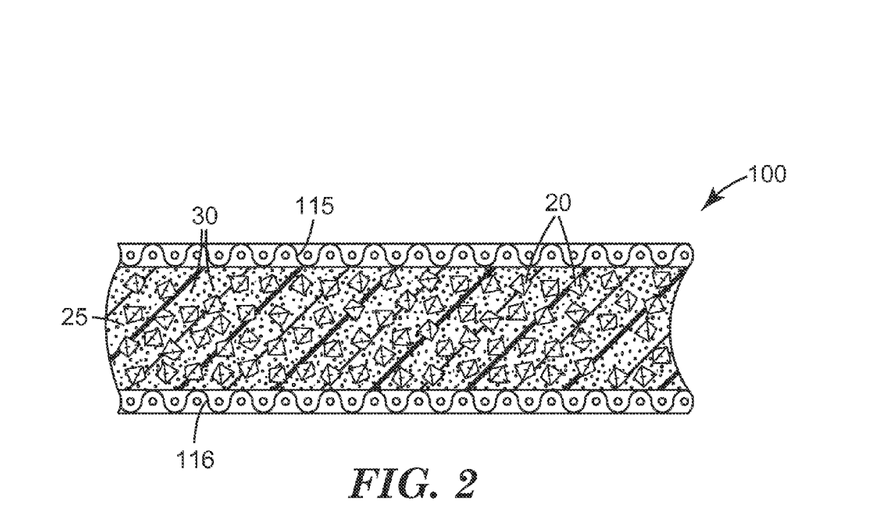
FIG. 2 is a cross-sectional side view of bonded abrasive wheel 100 shown in FIG. 1 taken along line 2-2.

Referring now to FIGS. 1 and 2, exemplary bonded abrasive wheel 100 according to one embodiment of the present disclosure has center hole 112 used for attaching bonded abrasive wheel 100 to, for example, a power driven tool. Bonded abrasive wheel 100 includes ceramic shaped abrasive particles 20, optional conventionally crushed and sized abrasive particles 30, and binder material 25. Optional first scrim 115 and optional second scrim 116 are disposed on opposed major surfaces of bonded abrasive wheel 100.

The ceramic shaped abrasive particles have four major sides joined by six common edges, wherein each of the major sides contacts three of the major sides, and wherein the six common edges have substantially the same length. Various embodiments having characteristic shapes are encompassed by the foregoing description.

Figure 3A:
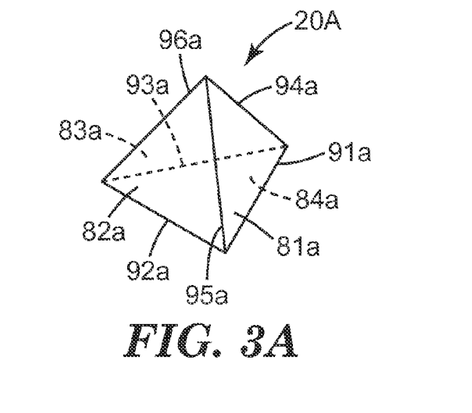

In one exemplary embodiment, shown in FIG. 3A, the ceramic shaped abrasive particles are shaped as regular tetrahedrons. Referring now to FIG. 3A, ceramic shaped abrasive particle 20A has four major sides (81a, 82a 83a, 84a) joined by six common edges (91a, 92a, 93a, 94a, 95a, 96a). Each of the major sides contacts the other three of the major sides at respective common edges. For example, major side 81a contacts major side 82a at common edge 95a, major side 81a contacts major side 84a at common edge 91a, and major side 81a contacts major side 83a at common edge 94a. While a regular tetrahedron (i.e., having six equal edges and four faces) is depicted in FIG. 3A, it will be recognized that other shapes are also permissible. For example, the ceramic shaped abrasive particles may be shaped as irregular (i.e., not regular) tetrahedrons, subject to the constraint that the six common edges have substantially the same length (defined hereinabove).

Figure 3B:
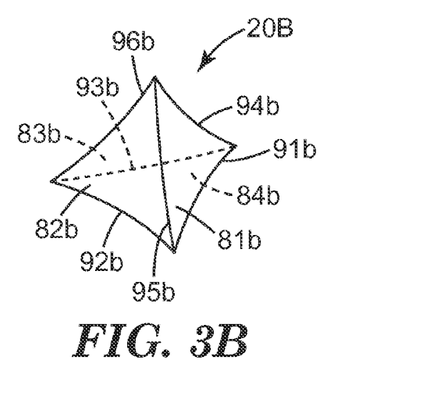
FIG. 3B is a schematic perspective view of an exemplary ceramic shaped abrasive particle 20b.

For example, in another exemplary embodiment, shown in FIG. 3B, the ceramic shaped abrasive particles are shaped as four-sided particles. Referring now to FIG. 3B, ceramic shaped abrasive particle 20B has four major sides (81b, 82b 83b, 84b) joined by six common edges (91b, 92b, 93b, 94b). Each of the major sides is concave and contacts the other three of the major sides at respective common edges. For example, major side 81b contacts major side 82b at common edge 95b, major side 81b contacts major side 84b at common edge 91b, and major side 81b contacts major side 83b at common edge 94b. While a particle with tetrahedral symmetry (i.e., four rotational axes of threefold symmetry and six reflective planes of symmetry) is depicted in FIG. 3B, it will be recognized that other shapes are also permissible. For example, the ceramic shaped abrasive particles may have one, two, or three concave faces with the remainder being planar, subject to the constraint that the six common edges have substantially the same length.

Figure 3C:
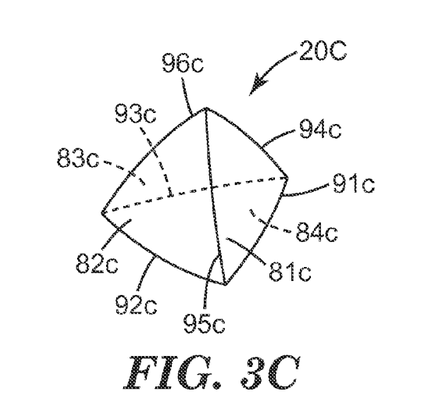
FIG. 3C is a schematic perspective view of an exemplary ceramic shaped abrasive particle 20c.

In another exemplary embodiment, shown in FIG. 3C, the ceramic shaped abrasive particles are shaped as four-sided particles. Referring now to FIG. 3C, ceramic shaped abrasive particle 20C has four major sides (81c, 82c 83c, 84c) joined by six common edges (91c, 92c, 93c, 94c). Each of the major sides is convex and contacts the other three of the major sides at respective common edges. For example, major side 81c contacts major side 82c at common edge 95c, major side 81c contacts major side 84c at common edge 91c, and major side 81c contacts major side 83c at common edge 94c. While a particle with tetrahedral symmetry is depicted in FIG. 3C, it will be recognized that other shapes are also permissible. For example, the ceramic shaped abrasive particles may have one, two, or three convex faces with the remainder being planar or concave, subject to the constraint that the six common edges have substantially the same length.

Figure 3D:
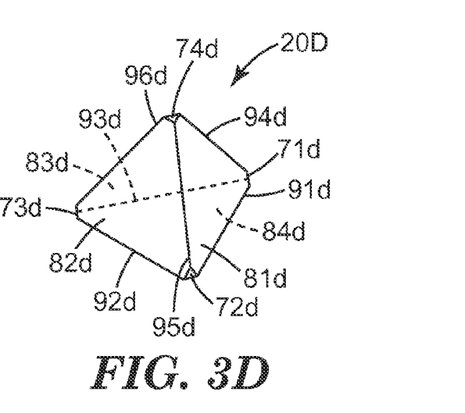
FIG. 3D is a schematic perspective view of an exemplary ceramic shaped abrasive particle 20d.

In another exemplary embodiment, shown in FIG. 3D, the ceramic shaped abrasive particles are shaped as eight-sided particles, having four major sides and four minor sides. Referring now to FIG. 3D, ceramic shaped abrasive particle 20D has four major sides (81d, 82d 83d, 84d) joined by six common edges (91d, 92d, 93d, 94d). Each of the major sides is hexagonal and contacts the other three of the major sides at respective common edges. For example, major side 81d contacts major side 82d at common edge 95d, major side 81d contacts major side 84d at common edge 91d, and major side 81d contacts major side 83d at common edge 94d. While a particle with tetrahedral symmetry is depicted in FIG. 3D, it will be recognized that other shapes are also permissible. For example, the ceramic shaped abrasive particles may have one, two, or three convex faces with the remainder being planar, subject to the constraint that the six common edges have substantially the same length.

Figure 3E:
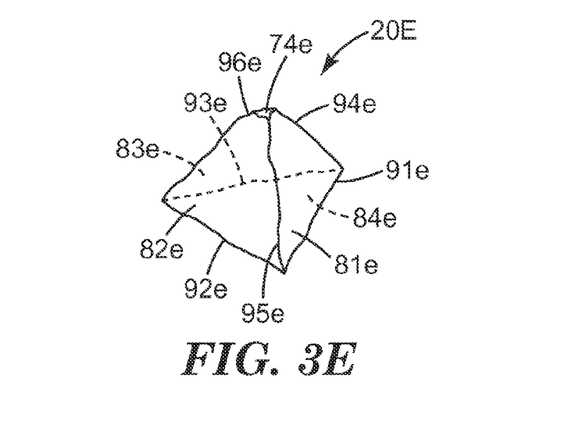
FIG. 3E is a schematic perspective view of an exemplary ceramic shaped abrasive particle 20e.

Of course, real world deviations from the idealized depictions in FIGS. 3A-3D will frequently be present. Such ceramic shaped abrasive particles are included as well. Referring now to FIG. 3E, ceramic shaped abrasive particle 20E has four major sides (81e, 82e 83e, 84e) joined by six common edges (91e, 92e, 93e, 94e). Each of the major sides contacts the other three of the major sides at respective common edges. For example, major side 81e contacts major side 82e at common edge 95e, major side 81e contacts major side 84e at common edge 91e, and major side 81e contacts major side 83e at common edge 94e.

The ceramic shaped abrasive particles may have a combination of the above shape elements (e.g., convex sides, concave sides, irregular sides, and planar sides). Similarly, combinations of ceramic shaped abrasive particles having different shapes and or sizes may be used.

In some embodiments, ceramic shaped abrasive particles can be made according to a multistep process. The process can be carried out using any ceramic precursor dispersion material.

Briefly, the method comprises the steps of making either a seeded or non-seeded ceramic precursor dispersion that can be converted into a corresponding ceramic (e.g., a boehmite sol-gel that can be converted to alpha alumina);

filling one or more mold cavities having the desired outer shape of the shaped abrasive particle with a ceramic precursor dispersion, drying the ceramic precursor dispersion to form precursor ceramic shaped abrasive particles; removing the precursor ceramic shaped abrasive particles from the mold cavities; calcining the precursor ceramic shaped abrasive particles to form calcined, precursor ceramic shaped abrasive particles, and then sintering the calcined, precursor ceramic shaped abrasive particles to form ceramic shaped abrasive particles. The process will now be described in greater detail in the context of alpha-alumina-containing ceramic shaped abrasive particles.

The first process step involves providing either a seeded or non-seeded dispersion of a ceramic precursor that can be converted into ceramic. The ceramic precursor dispersion often comprises a liquid that is a volatile component. In one embodiment, the volatile component is water. The dispersion should comprise a sufficient amount of liquid for the viscosity of the dispersion to be sufficiently low to enable filling mold cavities and replicating the mold surfaces, but not so much liquid as to cause subsequent removal of the liquid from the mold cavity to be prohibitively expensive. In one embodiment, the ceramic precursor dispersion comprises from 2 percent to 90 percent by weight of the particles that can be converted into ceramic, such as particles of aluminum oxide monohydrate (boehmite), and at least 10 percent by weight, or from 50 percent to 70 percent, or 50 percent to 60 percent, by weight of the volatile component such as water. Conversely, the ceramic precursor dispersion in some embodiments contains from 30 percent to 50 percent, or 40 percent to 50 percent, by weight solids.

Examples of useful ceramic precursor dispersions include zirconium oxide sols, vanadium oxide sols, cerium oxide sols, aluminum oxide sols, and combinations thereof. Useful aluminum oxide dispersions include, for example, boehmite dispersions and other aluminum oxide hydrates dispersions. Boehmite can be prepared by known techniques or can be obtained commercially. Examples of commercially available boehmite include products having the trade designations "DISPERAL", and "DISPAL", both available from Sasol North America, Inc. or "HIQ-40" available from BASF Corporation. These aluminum oxide monohydrates are relatively pure; that is, they include relatively little, if any, hydrate phases other than monohydrates, and have a high surface area.

The physical properties of the resulting ceramic shaped abrasive particles will generally depend upon the type of material used in the ceramic precursor dispersion. As used herein, a "gel" is a three dimensional network of solids dispersed in a liquid.

The ceramic precursor dispersion may contain a modifying additive or precursor of a modifying additive. The modifying additive can function to enhance some desirable property of the abrasive particles or increase the effectiveness of the subsequent sintering step. Modifying additives or precursors of modifying additives can be in the form of soluble salts, typically water soluble salts. They typically consist of a metal-containing compound and can be a precursor of oxide of magnesium, zinc, iron, silicon, cobalt, nickel, zirconium, hafnium, chromium, yttrium, praseodymium, samarium, ytterbium, neodymium, lanthanum, gadolinium, cerium, dysprosium, erbium, titanium, and mixtures thereof. The particular concentrations of these additives that can be present in the ceramic precursor dispersion can be varied based on skill in the art.

Typically, the introduction of a modifying additive or precursor of a modifying additive will cause the ceramic precursor dispersion to gel. The ceramic precursor dispersion can also be induced to gel by application of heat over a period of time to reduce the liquid content in the dispersion through evaporation. The ceramic precursor dispersion can also contain a nucleating agent. Nucleating agents suitable for this disclosure can include fine particles of alpha alumina, alpha ferric oxide or its precursor, titanium oxides and titanates, chrome oxides, or any other material that will nucleate the transformation. The amount of nucleating agent, if used, should be sufficient to effect the transformation of alpha alumina. Nucleating alpha alumina precursor dispersions is disclosed in U.S. Pat. No. 4,744,802 (Schwabel).

A peptizing agent can be added to the ceramic precursor dispersion to produce a more stable hydrosol or colloidal ceramic precursor dispersion. Suitable peptizing agents are monoprotic acids or acid compounds such as acetic acid, hydrochloric acid, formic acid, and nitric acid. Multiprotic acids can also be used but they can rapidly gel the ceramic precursor dispersion, making it difficult to handle or to introduce additional components thereto. Some commercial sources of boehmite contain an acid titer (such as absorbed formic or nitric acid) that will assist in forming a stable ceramic precursor dispersion.

The ceramic precursor dispersion can be formed by any suitable means; for example, in the case of a sol-gel alumina precursor by simply mixing aluminum oxide monohydrate with water containing a peptizing agent or by forming an aluminum oxide monohydrate slurry to which the peptizing agent is added.

Defoamers or other suitable chemicals can be added to reduce the tendency to form bubbles or entrain air while mixing. Additional chemicals such as wetting agents, alcohols, or coupling agents can be added if desired.

The second process step involves providing a mold having at least one mold cavity, and preferably a plurality of cavities formed in at least one major surface of the mold. In some embodiments, the mold is formed as a production tool, which can be, for example, a belt, a sheet, a continuous web, a coating roll such as a rotogravure roll, a sleeve mounted on a coating roll, or a die. In one embodiment, the production tool comprises polymeric material. Examples of suitable polymeric materials include thermoplastics such as polyesters, polycarbonates, poly(ether sulfone), poly(methyl methacrylate), polyurethanes, polyvinylchloride, polyolefin, polystyrene, polypropylene, polyethylene or combinations thereof, or thermosetting materials. In one embodiment, the entire tooling is made from a polymeric or thermoplastic material. In another embodiment, the surfaces of the tooling in contact with the ceramic precursor dispersion while drying, such as the surfaces of the plurality of cavities, comprises polymeric or thermoplastic materials and other portions of the tooling can be made from other materials. A suitable polymeric coating may be applied to a metal tooling to change its surface tension properties by way of example.

A polymeric or thermoplastic production tool can be replicated off a metal master tool. The master tool will have the inverse pattern desired for the production tool. The master tool can be made in the same manner as the production tool. In one embodiment, the master tool is made out of metal, e.g., nickel and is diamond turned. In one embodiment, the master tool is at least partially formed using stereolithography. The polymeric sheet material can be heated along with the master tool such that the polymeric material is embossed with the master tool pattern by pressing the two together. A polymeric or thermoplastic material can also be extruded or cast onto the master tool and then pressed. The thermoplastic material is cooled to solidify and produce the production tool. If a thermoplastic production tool is utilized, then care should be taken not to generate excessive heat that may distort the thermoplastic production tool limiting its life. More information concerning the design and fabrication of production tooling or master tools can be found in U.S. Pat. No. 5,152,917 (Pieper et al.); U.S. Pat. No. 5,435,816 (Spurgeon et al.); U.S. Pat. No. 5,672,097 (Hoopman et al.); U.S. Pat. No. 5,946,991 (Hoopman et al.); U.S. Pat. No. 5,975,987 (Hoopman et al.); and U.S. Pat. No. 6,129,540 (Hoopman et al.).

Access to cavities can be from an opening in the top surface or bottom surface of the mold. In some instances, the cavities can extend for the entire thickness of the mold. Alternatively, the cavities can extend only for a portion of the thickness of the mold. In one embodiment, the top surface is substantially parallel to bottom surface of the mold with the cavities having a substantially uniform depth. At least one side of the mold, that is, the side in which the cavities are formed, can remain exposed to the surrounding atmosphere during the step in which the volatile component is removed.

The cavities have a specified three-dimensional shape to make the ceramic shaped abrasive particles. The depth dimension is equal to the perpendicular distance from the top surface to the lowermost point on the bottom surface. The depth of a given cavity can be uniform or can vary along its length and/or width. The cavities of a given mold can be of the same shape or of different shapes.

The third process step involves filling the cavities in the mold with the ceramic precursor dispersion (e.g., by a conventional technique). In some embodiments, a knife roll coater or vacuum slot die coater can be used. A mold release can be used to aid in removing the particles from the mold if desired. Typical mold release agents include oils such as peanut oil or mineral oil, fish oil, silicones, polytetrafluoroethylene, zinc stearate, and graphite. In general, mold release agent such as peanut oil, in a liquid, such as water or alcohol, is applied to the surfaces of the production tooling in contact with the ceramic precursor dispersion such that between about 0.1 mg/in$^2$ (0.6 mg/cm$^2$) to about 3.0 mg/in$^2$ (20 m g/cm$^2$), or between about 0.1 mg/in$^2$ (0.6 mg/cm$^2$) to about 5.0 mg/in$^2$ (30 mg/cm$^2$) of the mold release agent is present per unit area of the mold when a mold release is desired. In some embodiments, the top surface of the mold is coated with the ceramic precursor dispersion. The ceramic precursor dispersion can be pumped onto the top surface.

Next, a scraper or leveler bar can be used to force the ceramic precursor dispersion fully into the cavity of the mold. The remaining portion of the ceramic precursor dispersion that does not enter cavity can be removed from top surface of the mold and recycled. In some embodiments, a small portion of the ceramic precursor dispersion can remain on the top surface and in other embodiments the top surface is substantially free of the dispersion. The pressure applied by the scraper or leveler bar is typically less than 100 psi (0.6 MPa), less than 50 psi (0.3 MPa), or even less than 10 psi (60 kPa). In some embodiments, no exposed surface of the ceramic precursor dispersion extends substantially beyond the top surface.

In those embodiments, wherein it is desired to have the exposed surfaces of the cavities result in planar faces of the shaped ceramic abrasive particles, it may be desirable to overfill the cavities (e.g., using a micronozzle array) and slowly dry the ceramic precursor dispersion.

The fourth process step involves removing the volatile component to dry the dispersion. Desirably, the volatile component is removed by fast evaporation rates. In some embodiments, removal of the volatile component by evaporation occurs at temperatures above the boiling point of the volatile component. An upper limit to the drying temperature often depends on the material the mold is made from. For polypropylene tooling the temperature should be less than the melting point of the plastic. In one embodiment, for a water dispersion of between about 40 to 50 percent solids and a polypropylene mold, the drying temperatures can be between about 90° C. to about 165° C., or between about 105° C. to about 150° C., or between about 105° C. to about 120° C. Higher temperatures can lead to improved production speeds but can also lead to degradation of the polypropylene tooling limiting its useful life as a mold.

During drying, the ceramic precursor dispersion shrinks, often causing retraction from the cavity walls. For example, if the cavities have planar walls, then the resulting ceramic shaped abrasive particles may tend to have at least three concave major sides. It is presently discovered that by making the cavity walls concave (whereby the cavity volume is increased) it is possible to obtain ceramic shaped abrasive particles that have at least three substantially planar major sides. The degree of concavity required generally depends on the solids content of the ceramic precursor dispersion.

The fifth process step involves removing resultant precursor ceramic shaped abrasive particles from the mold cavities. The precursor ceramic shaped abrasive particles can be removed from the cavities by using the following processes alone or in combination on the mold: gravity, vibration, ultrasonic vibration, vacuum, or pressurized air to remove the particles from the mold cavities.

The precursor ceramic shaped abrasive particles can be further dried outside of the mold. If the ceramic precursor dispersion is dried to the desired level in the mold, this additional drying step is not necessary. However, in some instances it may be economical to employ this additional drying step to minimize the time that the ceramic precursor dispersion resides in the mold. Typically, the precursor ceramic shaped abrasive particles will be dried from 10 to 480 minutes, or from 120 to 400 minutes, at a temperature from 50° C. to 160° C., or at 120° C. to 150° C.

The sixth process step involves calcining the precursor ceramic shaped abrasive particles. During calcining, essentially all the volatile material is removed, and the various components that were present in the ceramic precursor dispersion are transformed into metal oxides. The precursor ceramic shaped abrasive particles are generally heated to a temperature from 400° C. to 800° C., and maintained within this temperature range until the free water and over 90 percent by weight of any bound volatile material are removed. In an optional step, it may be desired to introduce the modifying additive by an impregnation process. A water-soluble salt can be introduced by impregnation into the pores of the calcined, precursor ceramic shaped abrasive particles. Then the precursor ceramic shaped abrasive particles are pre-fired again. This option is further described in U.S. Pat. No. 5,164,348 (Wood).

The seventh process step involves sintering the calcined, precursor ceramic shaped abrasive particles to form ceramic particles. Prior to sintering, the calcined, precursor ceramic shaped abrasive particles are not completely densified and thus lack the desired hardness to be used as ceramic shaped abrasive particles. Sintering takes place by heating the calcined, precursor ceramic shaped abrasive particles to a temperature of from 1000° C. to 1650° C. The length of time to which the calcined, precursor ceramic shaped abrasive particles must be exposed to the sintering temperature to achieve this level of conversion depends upon various factors but usually from five seconds to 48 hours is typical.

In another embodiment, the duration for the sintering step ranges from one minute to 90 minutes. After sintering, the ceramic shaped abrasive particles can have a Vickers hardness of 10 GPa (gigaPascal), 16 GPa, 18 GPa, 20 GPa, or greater.

Other steps can be used to modify the described process such as, for example, rapidly heating the material from the calcining temperature to the sintering temperature, centrifuging the ceramic precursor dispersion to remove sludge and/or waste. Moreover, the process can be modified by combining two or more of the process steps if desired. Conventional process steps that can be used to modify the process of this disclosure are more fully described in U.S. Pat. No. 4,314,827 (Leitheiser).

Ceramic shaped abrasive particles composed of crystallites of alpha alumina, magnesium alumina spinel, and a rare earth hexagonal aluminate may be prepared using sol-gel alpha alumina precursor particles according to methods described in, for example, U.S. Pat. No. 5,213,591 (Celikkaya et al.) and U.S. Publ. Pat. Appl. Nos. 2009/0165394 A1 (Culler et al.) and 2009/0169816 A1 (Erickson et al.). The alpha alumina abrasive grain may contain zirconia as disclosed in U.S. Pat. No. 5,551,963 (Larmie). Alternatively, the alpha alumina abrasive grain can have a microstructure or additives as disclosed in U.S. Pat. No. 6,277,161 (Castro). More information concerning methods to make ceramic shaped abrasive particles is disclosed in copending U.S. Publ. Patent Appln. No. 2009/0165394 A1 (Culler et al.).

The ceramic shaped abrasive particles used in the present disclosure can typically be made using tools (i.e., molds) cut using diamond tooling, which provides higher feature definition than other fabrication alternatives such as, for example, stamping or punching. Typically, the cavities in the tool surface have planar faces that meet along sharp edges, and form the sides of a regular tetrahedron. The resultant ceramic shaped abrasive particles have a respective nominal average shape that corresponds to the shape of cavities in the tool surface; however, variations (e.g., random variations) from the nominal average shape may occur during manufacture, and ceramic shaped abrasive particles exhibiting such variations are included within the definition of ceramic shaped abrasive particles as used herein.

The ceramic shaped abrasive particles may include particles having various shape features. For example, a ceramic shaped abrasive particle may have one or more major sides that are convex, planar, concave, or some other shape, and common edges that are curved or linear. Also, the ceramic shaped abrasive particles may include particles of different individual shapes, but having four sides joined by six common edges. Optionally, the major sides may be smooth and/or they may have cavities or protrusions therein; for example to provide additional sharp edges.

FIGS. 3A-3E depict various exemplary embodiments of shaped ceramic shaped abrasive particles according to the present disclosure.

In one exemplary embodiment, ceramic shaped abrasive particles may be shaped as a regular tetrahedron as shown in FIG. 3A. Accordingly, ceramic shaped abrasive particle 20*a* has four congruent planar major sides 81*a*, 82*a*, 83*a* and 84*a* joined by six common edges 91*a*, 92*a*, 93*a*, 94*a*, 95*a* and 96*a*.

In another exemplary embodiment, ceramic shaped abrasive particles may be shaped as shown in FIG. 3B. Accordingly, ceramic shaped abrasive particle 20*b* has four concave major sides 81*b*, 82*b*, 83*b* and 84*b* joined by six common edges 91*b*, 92*b*, 93*b*, 94*b*, 95*b* and 96*b*.

In yet another exemplary embodiment, ceramic shaped abrasive particles may be shaped as shown in FIG. 3C. Accordingly, ceramic shaped abrasive particle 20*c* has four convex major sides 81*c*, 82*c*, 83*c* and 84*c* joined by six common edges 91*c*, 92*c*, 93*c*, 94*c*, 95*c* and 96*c*.

In yet another exemplary embodiment, ceramic shaped abrasive particles may be shaped as a truncated tetrahedron wherein the vertices as shown in FIG. 3D. Accordingly, ceramic shaped abrasive particle 20*d* has four planar major sides 81*d*, 82*d*, 83*d* and 84*d* joined by six common edges 91*d*, 92*d*, 93*d*, 94*d*, 95*d* and 96*d* of substantially the same length.

In yet another exemplary embodiment, ceramic shaped abrasive particles may be substantially shaped as a truncated tetrahedron wherein one or more vertices and/or common edges are misshapen, for example, as a result of manufacturing defects as shown in FIG. 3E. Accordingly, ceramic shaped abrasive particle 20*e* has four major sides 81*e*, 82*e*, 83*e* and 84*e* joined by six common edges 91*e*, 92*e*, 93*e*, 94*e*, 95*e* and 96*e* of substantially the same length.

Surface coatings on the ceramic shaped abrasive particles may be used to improve the adhesion between the ceramic shaped abrasive particles and a binder material in abrasive articles, or can be used to aid in electrostatic deposition of the ceramic shaped abrasive particles. In one embodiment, surface coatings as described in U.S. Pat. No. 5,352,254 (Celikkaya) in an amount of 0.1 to 2 percent surface coating to shaped abrasive particle weight may be used. Such surface coatings are described in U.S. Pat. No. 5,213,591 (Celikkaya et al.); U.S. Pat. No. 5,011,508 (Wald et al.); U.S. Pat. No. 1,910,444 (Nicholson); U.S. Pat. No. 3,041,156 (Rowse et al.); U.S. Pat. No. 5,009,675 (Kunz et al.); U.S. Pat. No. 5,085,671 (Martin et al.); U.S. Pat. No. 4,997,461 (Markhoff-Matheny et al.); and U.S. Pat. No. 5,042,991 (Kunz et al.). Additionally, the surface coating may prevent the shaped abrasive particle from capping. Capping is the term to describe the phenomenon where metal particles from the workpiece being abraded become welded to the tops of the ceramic shaped abrasive particles. Surface coatings to perform the above functions are known to those of skill in the art.

Typically, the ceramic shaped abrasive particles have a relatively small maximum particle dimension; for example, less than about 5 mm, 2 mm, 1 mm, 5 micrometers, 200 micrometers, 100 micrometers, 50 micrometers, 20 micrometers or even less than 10 micrometers, although other sizes may be used.

In some embodiments, the ceramic shaped abrasive particles (and optionally any additional conventionally crushed abrasive particles) are sized according to an abrasives industry recognized specified nominal grade. Exemplary abrasive industry recognized grading standards include those promulgated by ANSI (American National Standards Institute), FEPA (Federation of European Producers of Abrasives), and JIS (Japanese Industrial Standard). Such industry accepted grading standards include, for example: ANSI 4, ANSI 6, ANSI 8, ANSI 16, ANSI 24, ANSI 30, ANSI 36, ANSI 40, ANSI 50, ANSI 60, ANSI 80, ANSI 100, ANSI 120, ANSI 150, ANSI 180, ANSI 220, ANSI 240, ANSI 280, ANSI 320, ANSI 360, ANSI 400, and ANSI 600; FEPA P8, FEPA P12, FEPA P16, FEPA P24, FEPA P30, FEPA P36, FEPA P40, FEPA P50, FEPA P60, FEPA P80, FEPA P100, FEPA P120, FEPA P150, FEPA P180, FEPA P220, FEPA P320, FEPA P400, FEPA P500, FEPA P600, FEPA P800, FEPA P1000, and FEPA P1200; and JIS 8, JIS 12, JIS 16, JIS 24, JIS 36, JIS 46, JIS 54, JIS 60, JIS 80, JIS 100, JIS 150, JIS 180, JIS 220, JIS 240, JIS 280, JIS 320, JIS 360, JIS 400, JIS 400, JIS 600, JIS 800, JIS 1000, JIS 1500, JIS 2500, JIS 4000, JIS 6000, JIS 8000, and JIS 10,000. More typically, the ceramic shaped abrasive particles are independently sized to ANSI 60 and 80 or FEPA P60 and P80 grading standards.

The term "abrasives industry recognized specified nominal grade" also includes abrasives industry recognized specified nominal screened grades. For example, specified nominal screened grades may use U.S.A. Standard Test Sieves conforming to ASTM E-11-09 "Standard Specification for Wire Cloth and Sieves for Testing Purposes." ASTM E-11-09 sets forth requirements for the design and construction of testing sieves using a medium of woven wire cloth mounted in a frame for the classification of materials according to a designated particle size. A typical designation may be represented as −18+20, meaning that the ceramic shaped abrasive particles pass through a test sieve meeting ASTM E-11-09 specifications for the number 18 sieve and are retained on a test sieve meeting ASTM E-11-09 specifications for the number 20 sieve. In one embodiment, the ceramic shaped abrasive particles have a particle size such that at least 90 percent of the particles pass through an 18 mesh test sieve and can be retained on a 20, 25, 30, 35, 40, 45, or 50 mesh test sieve. In various embodiments, the ceramic shaped abrasive particles can have a nominal screened grade comprising: −18+20, −20/+25, −25+30, −30+35, −35+40, 5−40+45, −45+50, −50+60, −60+70, −70/+80, −80+100, −100+120, −120+140, −140+170, −170+200, −200+230, −230+270, −270+325, −325+400, −400+450, −450+500, or −500+635.

Bonded abrasive articles (e.g., grinding wheels, cut-off wheels, hones, and whet stones) according to the present disclosure are typically made by a molding process. During molding, a binder material precursor, either liquid organic, powdered inorganic, or powdered organic, is mixed with the abrasive particles. In some instances, a liquid medium (either resin or a solvent) is first applied to the abrasive particles to wet their outer surface, and then the wetted particles are mixed with a powdered medium. Bonded abrasive articles according to the present disclosure may be made by compression molding, injection molding, transfer molding, or the like. The molding can be done either by hot or cold pressing or any suitable manner known to those skilled in the art.

The binder material typically comprises a glassy inorganic material (e.g., as in the case of vitrified abrasive wheels), metal, or an organic resin (e.g., as in the case of resin-bonded abrasive wheels).

Glassy inorganic binders may be made from a mixture of different metal oxides. Examples of these metal oxide vitreous binders include silica, alumina, calcia, iron oxide, titania, magnesia, sodium oxide, potassium oxide, lithium oxide, manganese oxide, boron oxide, phosphorous oxide, and the like. Specific examples of vitreous binders based upon weight include, for example, 47.61 percent $SiO_2$, 16.65 percent $Al_2O_3$, 0.38 percent $Fe_2O_3$, 0.35 percent $TiO_2$, 1.58 percent CaO, 0.10 percent MgO, 9.63 percent $Na_2O$, 2.86 percent $K_2O$, 1.77 percent $Li_2O$, 19.03 percent $B_2O_3$, 0.02 percent $MnO_2$, and 0.22 percent $P_2O_5$; and 63 percent $SiO_2$, 12 percent $Al_2O_3$, 1.2 percent CaO, 6.3 percent $Na_2O$, 7.5 percent $K_2O$, and 10 percent $B_2O_3$. Still other examples of vitreous binder based upon a molar ratio include 3.77 percent $SiO_2$, 0.58 percent $Al_2O_3$, 0.01 percent $Fe_2O_3$, 0.03 percent $TiO_2$, 0.21 percent CaO, 0.25 percent MgO, 0.47 percent $Na_2O$, and 0.07 percent $K_2O$. During manufacture of a vitreous bonded abrasive article, the vitreous binder, in a powder form, may be mixed with a temporary binder, typically an organic binder. The vitrified binders may also be formed from a frit, for example anywhere from about one to 100 percent frit, but generally 20 to 100 percent frit. Some examples of common materials used in frit binders include feldspar, borax, quartz, soda ash, zinc oxide, whiting, antimony trioxide, titanium dioxide, sodium silicofluoride, flint, cryolite, boric acid, and combinations thereof. These materials are usually mixed together as powders, fired to fuse the mixture and then the fused mixture is cooled. The cooled mixture is crushed and screened to a very fine powder to then be used as a frit binder. The temperature at which these frit bonds are matured is dependent upon its chemistry, but may range from anywhere from about 600° C. to about 1800° C.

Examples of metal binders include tin, copper, aluminum, nickel, and combinations thereof.

Organic binder materials are typically included in an amount of from 5 to 30 percent, more typically 10 to 25, and more typically 15 to 24 percent by weight, based of the total weight of the bonded abrasive article. Phenolic resin is the most commonly used organic binder material, and may be used in both the powder form and liquid state. Although phenolic resins are widely used, it is within the scope of this disclosure to use other organic binder materials including, for example, epoxy resins, urea-formaldehyde resins, rubbers, shellacs, and acrylic binders. The organic binder material may also be modified with other binder materials to improve or alter its properties.

Useful phenolic resins include novolac and resole phenolic resins. Novolac phenolic resins are characterized by being acid-catalyzed and having a ratio of formaldehyde to phenol of less than one, typically between 0.5:1 and 0.8:1. Resole phenolic resins are characterized by being alkaline catalyzed and having a ratio of formaldehyde to phenol of greater than or equal to one, typically from 1:1 to 3:1. Novolac and resole phenolic resins may be chemically modified (e.g., by reaction with epoxy compounds), or they may be unmodified. Exemplary acidic catalysts suitable for curing phenolic resins include sulfuric, hydrochloric, phosphoric, oxalic, and p-toluenesulfonic acids. Alkaline catalysts suitable for curing phenolic resins include sodium hydroxide, barium hydroxide, potassium hydroxide, calcium hydroxide, organic amines, or sodium carbonate.

Phenolic resins are well-known and readily available from commercial sources. Examples of commercially available novolac resins include DUREZ 1364, a two-step, powdered phenolic resin (marketed by Durez Corporation of Addison, Tex. under the trade designation VARCUM (e.g., 29302), or HEXION AD5534 RESIN (marketed by Hexion Specialty Chemicals, Inc., Louisville, Ky.). Examples of commercially available resole phenolic resins useful in practice of the present disclosure include those marketed by Durez Corporation of Addison, Tex. under the trade designation VARCUM (e.g., 29217, 29306, 29318, 29338, 29353); those marketed by Ashland Chemical Co. of Bartow, Fla. under the trade designation AEROFENE (e.g., AEROFENE 295); and those marketed by Kangnam Chemical Company Ltd. of Seoul, South Korea under the trade designation "PHENOLITE" (e.g., PHENOLITE TD-2207).

Curing temperatures of organic binder material precursors will vary with the material chosen and wheel design. Selection of suitable conditions is within the capability of one of ordinary skill in the art. Exemplary conditions for a phenolic binder may include an applied pressure of about 20 tons per 4" diameter (224 kg/cm$^2$) at room temperature followed by heating at temperatures up to about 185° C. for sufficient time to cure the organic binder material precursor.

In some embodiments, the bonded abrasive articles include from about 10 to 60 percent by weight of ceramic shaped abrasive particles; typically 30 to 60 percent by weight, and more typically 40 to 60 percent by weight, based on the total weight of the binder material and abrasive particles.

Bonded abrasive articles may further comprise crushed abrasive particles (i.e., abrasive particles not resulting from breakage of the ceramic shaped abrasive particles and corresponding to an abrasive industry specified nominal graded or combination thereof). The crushed abrasive particles are typically of a finer size grade or grades (e.g., if a plurality of size grades are used) than the ceramic shaped abrasive particles, although this is not a requirement.

Useful crushed abrasive particles include, for example, crushed particles of fused aluminum oxide, brown fused aluminum oxide, heat treated aluminum oxide, white fused aluminum oxide, ceramic aluminum oxide materials such as those commercially available under the trade designation 'CUBITRON' from 3M Company of St. Paul, Minn.), black silicon carbide, green silicon carbide, titanium diboride, boron carbide, tungsten carbide, titanium carbide, diamond, cubic boron nitride, garnet, fused alumina zirconia, aluminum oxynitride, sol-gel derived abrasive particles, iron oxide, chromia, ceria, zirconia, titania, silicates, tin oxide, silica (such as quartz, glass beads, glass bubbles and glass fibers) silicates (such as talc, clays (e.g., montmorillonite), feldspar, mica, calcium silicate, calcium metasilicate, sodium aluminosilicate, sodium silicate), flint, and emery. Examples of sol-gel derived abrasive particles can be found in U.S. Pat. No. 4,314,827 (Leitheiser et al.), U.S. Pat. No. 4,623,364 (Cottringer et al.); U.S. Pat. No. 4,744,802 (Schwabel), U.S. Pat. No. 4,770,671 (Monroe et al.); and U.S. Pat. No. 4,881,951 (Monroe et al.). It is also contemplated that the abrasive particles could comprise abrasive agglomerates such, for example, as those described in U.S. Pat. No. 4,652,275 (Bloecher et al.) or U.S. Pat. No. 4,799,939 (Bloecher et al.).

The abrasive particles may, for example, be uniformly or non-uniformly distributed throughout the bonded abrasive article. For example, if the bonded abrasive wheel is a grinding wheel or a cut-off wheel, the abrasive particles may be concentrated toward the middle (e.g., located away from the outer faces of a grinding or cut-off wheel), or only in the outer edge, i.e., the periphery, of a grinding or cut-off wheel. In another variation, first abrasive particles may be in one side of the wheel with different abrasive particles on the opposite side. However, typically all the abrasive particles are homogenously distributed among each other, because the manufacture of the wheels is easier, and the cutting effect is optimized when the two types of abrasive particles are closely positioned to each other.

Bonded abrasive articles according to the present disclosure may comprise additional abrasive particles beyond those mentioned above, subject to weight range requirements of the other constituents being met. Examples include fused aluminum oxide (including fused alumina-zirconia), brown aluminum oxide, blue aluminum oxide, silicon carbide (including green silicon carbide), garnet, diamond, cubic boron nitride, boron carbide, chromia, ceria, and combinations thereof.

The abrasive particles may optionally be treated with one or more coupling agents to enhance adhesion of the abrasive particles to the binder. The abrasive particles may be treated with the coupling agent(s) before combining them with the binder material, or they may be surface treated in situ by including a coupling agent to the binder material. Coupling agents are well-known to those of skill in the abrasive arts. Examples of coupling agents include organosilane coupling agents (e.g., gamma-aminopropyltriethoxysilane), titanates, and zirconates.

In some embodiments, bonded abrasive articles according to the present disclosure contain additional grinding aids such as, for example, polytetrafluoroethylene particles, cryolite, sodium chloride, $FeS_2$ (iron disulfide), or $KBF_4$; typically in amounts of from 1 to 25 percent by weight, more typically 10 to 20 percent by weight, subject to weight range requirements of the other constituents being met. Grinding aids are added to improve the cutting characteristics of the bonded abrasive (e.g., when used dry without coolant), generally by reducing the temperature of the cutting interface. The grinding aid may be in the form of single particles or an agglomerate of grinding aid particles. Examples of precisely shaped grinding aid particles are taught in U.S. Pat. Publ. No. 2002/0026752 A1 (Culler et al.).

The binder material may optionally contain one or more plasticizers such as, for example, that available as SANTI-CIZER 154 PLASTICIZER from UNIVAR USA, Inc. of Chicago, Ill.

Bonded abrasive articles according to the present disclosure may contain additional components such as, for example, filler particles, subject to weight range requirements of the other constituents being met. Filler particles may be added to occupy space and/or provide porosity. Porosity enables the bonded abrasive article to shed used or worn abrasive particles to expose new or fresh abrasive particles.

Bonded abrasive articles according to the present disclosure have any range of porosity; for example, from about 1 percent to 50 percent, typically 1 percent to 40 percent by volume. Examples of fillers include bubbles and beads (e.g., glass, ceramic (alumina), clay, polymeric, metal), cork, gypsum, marble, limestone, flint, silica, aluminum silicate, and combinations thereof.

Bonded abrasive articles according to the present disclosure can be made according to any suitable method. In one suitable method, ceramic shaped abrasive particles are coated with a coupling agent prior to mixing with a curable resole phenolic. The amount of coupling agent is generally selected such that it is present in an amount of 0.1 to 0.3 parts for every 50 to 84 parts of abrasive particles, although amounts outside this range may also be used. To the resulting mixture is added the liquid resin, as well as the curable novolac phenolic resin and the cryolite. The mixture is pressed into a mold (e.g., at an applied pressure of 20 tons per 4 inches diameter (224 kg/cm$^2$) at room temperature. The molded wheel is then cured by heating at temperatures up to about 185° C. for sufficient time to cure the curable phenolic resins.

Bonded abrasive articles according to the present disclosure are useful, for example, as grinding wheels and cut-off wheels.

Grinding wheels typically have a thickness of 0.5 cm to 100 cm, more typically 1 cm to 10 cm, and typically have a diameter between about 1 cm and 100 cm, more typically between about 10 cm and 100 cm, although other dimensions may also be used. For example, bonded abrasive articles may be in the form of a cup wheel generally between 10 and 15 cm in diameter, or may be in the form of a snagging wheel of up to 100 cm in diameter, or may also be in the form of a depressed-center grinding wheel of up to about 25 cm in diameter. An optional center hole may be used to attaching the cut-off wheel to a power driven tool. If present, the center hole is typically 0.5 cm to 2.5 cm in diameter, although other sizes may be used. The optional center hole may be reinforced; for example, by a metal flange. Alternatively, a mechanical fastener may be axially secured to one surface of the cut-off wheel. Examples include threaded posts.

Cut-off wheels typically have a thickness of 0.80 millimeter (mm) to 16 mm, more typically 1 mm to 8 mm, and typically have a diameter between 2.5 cm and 100 cm (40 inches), more typically between about 7 cm and 13 cm, although other dimension may also be used. An optional center hole may be used to attaching the cut-off wheel to a power driven tool. If present, the center hole is typically 0.5 cm to 2.5 cm in diameter, although other sizes may be used. The optional center hole may be reinforced; for example, by a metal flange. Alternatively, a mechanical fastener may be axially secured to one surface of the cut-off wheel. Examples include threaded posts, threaded nuts, Tinnerman nuts, and bayonet mount posts.

Optionally, bonded abrasive articles according to the present disclosure may further comprise a scrim that reinforces the bonded abrasive article; for example, disposed on one or two major surfaces of the bonded abrasive article, or disposed within the bonded abrasive article. Examples of scrims include a woven or a knitted cloth. The fibers in the scrim may be made from glass fibers (e.g., fiberglass), organic fibers such as polyamide, polyester, or polyimide. In some instances, it may be desirable to include reinforcing staple fibers within the bonding medium, so that the fibers are homogeneously dispersed throughout the bonded abrasive article.

Bonded abrasive articles according to the present disclosure are useful, for example, for abrading a workpiece. For example, they may be formed into grinding or cut-off wheels that exhibit good grinding characteristics while maintaining a relatively low operating temperature that may avoid thermal damage to the workpiece.

Bonded abrasive grinding wheels can be used on any right angle grinding tool such as, for example, those available from Ingersoll-Rand, Sioux, Milwaukee, and Cooper Power Tools of Lexington, S.C. The tool can be electrically or pneumatically driven, generally at speeds from about 1000 to 50000 RPM.

During use, the bonded abrasive wheel can be used dry or wet. During wet grinding, the bonded abrasive wheel is used in conjunction with water, oil-based lubricants, or water-based lubricants. Bonded abrasive wheels according to the present disclosure may be particularly useful on various workpiece materials such as, for example, carbon steel sheet or bar stock and more exotic metals (e.g., stainless steel or titanium), or on softer more ferrous metals (e.g., mild steel, low alloy steels, or cast irons).

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight. In Tables in the Examples, "NA" means not applicable.

Materials Used in the Examples

TABLE 1

| ABBREVIATION | DESCRIPTION |
| --- | --- |
| SAPn | Shaped abrasive particles as described in Table 2 |
| AP1 | Grade 36, surface modified ceramic alumina abrasive particles, obtained as CUBITRON 324AV from 3M, St. Paul, Minnesota |
| AP2 | ANSI Grade 60 CX aluminum oxide abrasive particles, obtained from Washington Mills Electro Minerals, Niagara Falls, New York. |
| AP3 | Grade 80, sol gel derived ceramic alumina abrasive particles, obtained as CUBITRON 321 from 3M, St. Paul, Minnesota |
| AP4 | Grade 50, sol gel derived ceramic alumina abrasive particles, obtained as CUBITRON 324AV from 3M, St. Paul, Minnesota |
| CRY | Synthetic cryolite ($Na_3AlF_6$), obtained as RTN CRYOLITE from TR International Trading Co. of Houston, Texas |
| PR1 | A one-step liquid phenolic resin, obtained as VARCUM 29353 from Durez Corp. of Addison, Texas |
| PR2 | A two-step, powdered phenolic resin, obtained as VARCUM 29302 from Durez Corp. |
| SM | 4-inch (10 cm) diameter fiberglass scrim discs, obtained as 3321 from Industrial Polymers & Chemicals of Shrewsbury, Massachusetts |

Description of Molds Used to Make Ceramic Shaped Abrasive Particles SAP1-SAP3

The molds used to make the particles of SAP1-SAP3 were generated by a rapid prototyping device known as a PERFACTORY SXGA+W/ERM MINI MULTI LENS STEREOLITHOGRAPHY device manufactured by envisionTEC GmbH of Gladbeck, Germany. The envisionTEC machine was configured with a projector lens having a focal distance of 60 mm. The resin used to build these molds was envisionTEC R5. For SAP1, the regular tetrahedral cavities had an edge length of 3 mm. For SAP3, the regular tetrahedral cavities had an edge length of 2 mm. For SAP2, the regular tetrahedron had a 3 mm edge length with side faces with a 0.14 mm bulge central to each cavity side (i.e., on each of the three cavity walls and resulting in concavity on the corresponding face of the abrasive particle.).

Description of Molds Used to Make Ceramic Shaped Abrasive Particles SAP4-SAP5

The mold used to make the particles of SAP4 was an array of regular tetrahedral cavities with close-packed equilateral triangle-shaped openings (side length (pitch)=0.9429 mm). Each regular tetrahedral cavity had a depth of 0.8171 mm and a draft angle of 77.5 degrees. The land area between the openings was 0.0508 mm wide.

The mold used to make the particles of SAP5 was an array of regular tetrahedral cavities with close-packed equilateral triangle-shaped openings (side length (pitch)=1.5918 mm). Each regular tetrahedral cavity had a depth of 1.3571 mm and a draft angle of 77.5 degrees. The land area between the openings was 0.1016 mm wide.

Description of Molds Used to Make Comparative Ceramic Shaped Abrasive Particles SAPA-SAPC:

The mold had close-packed shaped triangular cavities with equal length of all three sides (i.e., the cavity had the shape of a truncated triangular pyramid). The side length of the mold cavities used to make SAPA, and SAPB was 2.79 mm (110 mils). For SAPA and SAPB, the mold was manufactured such that the mold cavities had parallel ridges rising from the bottom surfaces of the cavities that intersected with one side of the triangle at a 90 degree angle. The parallel ridges were spaced 0.277 mm (10.9 mils) apart, and the cross-section of the ridges was a triangle shape having a height of 0.0127 mm (0.5 mils) and a 45 degree angle between the sides of each ridge at the tip. For SAPA, the side wall depth was 0.91 mm (36 mils). For SAPB, the mold was manufactured such that the mold cavities had parallel ridges protruding into the bottom surfaces of the mold cavities that intersected with one side of the triangle at a 90 degree angle. The parallel ridges were spaced 0.10 mm (3.9 mils) apart, and the cross-section of the ridges was a triangle shape having a height of 0.0032 mm (0.126 mils) and a 45 degree angle between the sides of each ridge at the tip. For SAPB, the side wall depth was 0.46 mm (18 mils).

SAPC: The side length of the mold cavities used to make SAPC was 1.66 mm (65 mils). The side wall depth was 0.80 mm (31 mils). The mold cavities had parallel ridges rising from the bottom that intersected with one side of the triangle at a 90 degree angle. The parallel ridges were spaced 0.150 mm (5.9 mils) apart, and the cross-section of the ridges was a triangle shape having a height of 0.0127 mm (0.5 mil) and a 30 degree angle between the sides of each ridge at the tip.

For SAPA-SAPC the slope angle (i.e., the dihedral angle formed between the base of the mold cavities and each of the sidewalls) was 98 degrees.

Technique for Measuring Radius of Curvature

The radius of curvature for all samples was determined according to the following method: The ceramic shaped abrasive particles have a radius of curvature along the side edges connecting the base and top of the ceramic shaped abrasive particles of 50 micrometers or less. The radius of curvature was measured from a polished cross-section taken between the top and bottom surfaces, for example, using a CLEMEX VISION PE image analysis program available from Clemex Technologies, Inc. of Longueuil, Quebec, Canada, interfaced with an inverted light microscope, or other suitable image analysis software/equipment. The radius of curvature for each point of the shaped abrasive particle was determined by defining three points at the tip of each point when viewed in cross-section (e.g., at 100× magnification). The first point was placed at the start of the tip's curve where there is a transition from the straight edge to the start of a curve, the second point was located at the apex of the tip, and the third point at the transition from the curved tip back to a straight edge. The image analysis software then draws an arc defined by the three points (start, middle, and end of the curve) and calculates a radius of curvature. The radius of curvature for at least 30 apexes are measured and averaged to determine the average tip radius.

Technique for Measuring Particle Length

The dimensions of the final particles were measured using a commercially available "AM413ZT DINO-LITE PRO" digital microscope, obtained from www.BigC.com of Torrence, Calif. Five particles of each batch were laid flat, and an image was taken at 100× magnification. The lengths of all three sides of each particle were measured using the built-in computer software of the digital camera. The average of those 15 length measurements was calculated, as well as the standard deviation.

Technique for Measuring Particle Thickness for SAP1-SAP5 Abrasive Particles

The particle thickness was calculated from the measured particle length according to the geometric properties of a regular tetrahedron.

Technique for Measuring Particle Thickness for SAPA-SAPC Abrasive Particles

The dimensions of the abrasive particles were measured using a commercially available "AM413ZT DINO-LITE PRO" digital microscope, available from www.BigC.com of Torrence, Calif. The average particle thickness was determined by mounting five particles of each type sideways (the flat sides being perpendicular to the table surface) and taking images of the particle sides at 100× magnification. The particle thickness of the center and close to each edge was measured for each side, using the cursor of the provided software. The particles were then rotated 120 degrees perpendicular to the table surface, and three height measurements were taken of the second and third side, respectively. Thus, 9 particle thickness measurements were taken of each sample, a total of 45 measurements for 5 particles. The average and standard deviation were calculated.

Grinding Test (Total Cut, 10 Cycles)

The example wheels for testing were mounted on a reciprocating grinding machine. Pre-weighed test work pieces were 400 mm×50 mm×7 mm coupons of 1018 steel and were mounted to be engaged by the grinding wheel at an angle of 15 degrees relative to the horizontal top surface of the work piece. The work piece was mounted such that it was standing on the 400 mm×7 mm side. The grinding machine was activated to rotate the grinding wheel at 6000 RPM. The rotating grinding wheel was urged against the test workpiece at a force of 58 N while traversing the long dimension of the workpiece at a rate of 6 inches per second (15.24 cm/sec). Test cycles were 1.0 minutes. The test work pieces were weighed after the 1st, 5th, and 10th cycles. After 10 one-minute grinding cycles, the total weight of the work piece removed was determined and reported as Total Cut, 10 cycles.

Cut Test

The example cut-off wheels were tested on a Matermini cut test machine, model PTA 100/230, from Davide Matermini SPA, Malnate, Italy) fitted with a 230V 4-inch Bosch grinder model GWS 6-100 (nominal rpm 10,000). The cut test machine was used at the following parameters: test program 100-SS-R, cutting current: 3.5 A, Factor kp=15, Factor kd=30. The work pieces were 16 mm solid stainless steel rods. Both the average cut time and the number of cuts were recorded until the cut-off wheels reached a diameter of 90 mm.

Preparation of REO-Doped Ceramic Shaped Abrasive Particles (SAP1-SAP5 and SAPA-SAPC)

A sample of boehmite sol-gel was made using the following recipe: aluminum oxide monohydrate powder (1600 parts) available as DISPERAL from Sasol North America, Inc. was dispersed by high shear mixing a solution containing water (2400 parts) and 70 percent aqueous nitric acid (72 parts) for 11 minutes. The resulting sol-gel was aged for at least 1 hour before coating. The sol-gel was forced into production tooling having triangular shaped mold cavities of dimensions reported above.

The sol-gel was forced into the cavities with a putty knife so that the openings of the production tooling were completely filled. A mold release agent, 1 percent peanut oil in methanol was used to coat the production tooling with about 0.5 mg/in$^2$ (0.08 mg/cm$^2$) of peanut oil applied to the production tooling. The excess methanol was removed by placing sheets of the production tooling in an air convection oven for 5 minutes at 45° C. The sol-gel coated production tooling was placed in an air convection oven at 45° C. for at least 45 minutes to dry. The precursor ceramic shaped abrasive particles were removed from the production tooling by passing it over an ultrasonic horn. The precursor ceramic shaped abrasive particles were calcined at approximately 650° C. The calcined, precursor ceramic shaped abrasive particles were impregnated with an alternative rare earth oxide (REO) solution comprising 1.4 percent MgO, 1.7 percent $Y_2O_3$, 5.7 percent $La_2O_3$ and 0.07 percent CoO. Into 70 grams of the REO solution, 1.4 grams of HYDRAL COAT 5 powder available from Almatis of Pittsburgh, Pa. (approximately 0.5 micron mean particle size) is dispersed by stirring it in an open beaker. About 100 grams of calcined, precursor ceramic shaped abrasive particles is then impregnated with the 71.4 grams of the HYDRAL COAT 5 powder dispersion in REO solution. The impregnated, calcined, precursor ceramic shaped abrasive particles were then calcined again at 650° C. before sintering to final hardness at approximately 1400° C. Both the calcining and sintering were carried out using rotary tube kilns. The resulting composition was an alumina composition containing 1 weight percent MgO, 1.2 weight percent of $Y_2O_3$, 4 weight percent of $La_2O_3$ and 0.05 weight percent of CoO, with traces of $TiO_2$, $SiO_2$, and CaO. The resulting abrasive particle dimensions are reported in Table 2 (below).

test composition. This circumferential band (e.g. "tire") of inventive or comparative composition was 1.0 cm thick along the perimeter of each wheel.

The interior 80% composition of Example 1 was made by combining, based on the finished grinding wheel weight, 44 parts AP1, 3.8 parts AP2, and 2.48 parts AP3. 4.4 parts PR1 was added with stirring followed by 13.88 parts PR2 and 12 parts CRY. The exterior (circumferential) 20% band was made by combining 5.5 parts SAP1, 5.5 parts AP1, 0.95 parts AP2, and 0.62 parts AP3. 1.1 parts of PR1 was added with stirring, followed by 3.47 parts PR2 and 3 parts CRY. The radially-stratified mix was sandwiched between layers of SM in a 105 mm diameter die and pressed in a single cavity press at a pressure of 20 tons/12.27 inch² (230 kg/cm²). The grinding wheel was then placed between metal plates, separated by TEFLON coated sheets, and placed in a

TABLE 2

| PARTICLE | SHAPE | APPROXIMATE. MESH SIZE | AVERAGE PARTICLE LENGTH, mm, (standard deviation) | AVERAGE PARTICLE THICKNESS, mm, (standard deviation) | AVERAGE PARTICLE ASPECT RATIO, length/thickness | AVERAGE RADIUS OF CURVATURE OF ABRASIVE PARTICLE SIDE EDGES, micrometers, (standard deviation) | MOLD CAVITY DIMENSIONS |
|---|---|---|---|---|---|---|---|
| SAP1 | regular equilateral tetrahedron | 18 | 1.2 (0.044) | 1.06 (0.04) | 1.13 | 38 (23) | regular tetrahedron with 3 mm edge |
| SAP2 | regular equilateral tetrahedron with concave faces | 18 | 1.39 (0.116) | 1.06 (0.12) | 1.13 | 25.98 (18.59) | regular tetrahedron with concave faces, 3 mm edge |
| SAP3 | regular equilateral tetrahedron | 20 | 0.897 (0.0381) | 0.78 (0.04) | 1.15 | 41.62 (17.65) | regular tetrahedron with 2 mm edge |
| SAP4 | regular equilateral tetrahedron | 30 | 0.474 (0.0201) | 0.410 (0.02) | 1.15 | 17.07 (2.84) | regular tetrahedron with 0.99 mm edge |
| SAP5 | regular equilateral tetrahedron | 25 | 0.794 (0.0337) | 0.687 (0.03) | 1.15 | 18.31 (5.80) | regular tetrahedron with 1.67 mm edge |
| SAPA | regular truncated triangular pyramid | 18 | 1.383 (0.063) | 0.31 (0.08) | 4.5 | 13.71 (9.1477) | 2.79 mm length × 0.91 mm depth, 98° slope angle |
| SAPB | regular truncated triangular pyramid | 18 | 1.447 (0.044) | 0.164 (0.033) | 8.8 | 22.74 (13.29) | 2.79 mm length × 0.46 mm depth, 98° slope angle |
| SAPC | regular truncated triangular pyramid | 20 | 0.765 (0.064) | 0.258 (0.058) | 3 | 8.01 (3.8513) | 1.72 mm length × 0.02 mm depth, 98° slope angle |

Examples 1-3 and Comparative Examples A-C

Grinding wheels of Examples 1-3 and Comparative Examples A-C were constructed to demonstrate the effects of incorporating particles of various geometries into 4-inch (105 mm) grinding wheels.

In Example 1, radially-stratified, reinforced wheels were constructed having a radial-interior (80% of the radius of the wheel, comprising a conventional bonded abrasive composition) and a circumferential band (20% of the wheel) of the curing oven. After a curing cycle of about 40 hours (Segment 1: set point 174° F. (78.8° C.), ramp up over 4 minutes, soak for 7 hours; Segment 2: set point 225° F. (107° C.), ramp up over 4 hours 20 minutes, soak for 3 hours; Segment 3: set point 365° F. (185° C.), ramp up over 3 hours 15 minutes, soak for 18 hours; Segment 4: set point 80° F. (26.6° C.), ramp down over 4 hours 27 minutes, soak for 5 minutes), a ⅞-inch (22.2 mm) center hole was drilled using a diamond drill, and the grinding wheel was trued to 98 mm diameter.

Examples 2-3 and Comparative Examples A-C were made identically to Example 1 with the exception that the compositions were adjusted as shown in Table 3.

Comparative Example D

Comparative Example D was a wheel made identically to Example 1, with the exception that the composition was uniform throughout as shown in Table 3, below. The grinding wheel of Comparative Example D contained only crushed abrasive particles.

hours (Segment 1: set point 174° F. (78.8° C.), ramp up over 4 minutes, soak for 7 hours; Segment 2: set point 225° F. (107° C.), ramp up over 4 hours 20 minutes, soak for 3 hours; Segment 3: set point 365° F. (185° C.), ramp up over 3 hours 15 minutes, soak for 18 hours; Segment 4: set point 80° F. (26.6° C.), ramp down over 4 hours 27 minutes, soak for 5 minutes), the dimensions of the final cut-off wheels were 104.03-104.76 mm×1.34-1.63 mm×9.5 mm.

The cut-off wheels were tested according to the Cut Test. Results are reported in Table 4.

TABLE 3

| EXAMPLE | | SAP1 | SAP2 | SAP3 | SAPA | SAPB | SAPC | AP1 | AP2 | AP3 | PR1, pbw | PR2, pbw | CRY, pbw | TOTAL CUT, 10 cycles, grams |
|---|---|---|---|---|---|---|---|---|---|---|---|---|---|---|
| 1 | Outside | 5.5 | | | | | | 5.5 | 0.95 | 0.62 | 1.1 | 3.47 | 3 | 415.49 |
| | Inside | | | | | | | 44 | 3.8 | 2.48 | 4.4 | 13.88 | 12 | NA |
| 2 | Outside | | 5.5 | | | | | 5.5 | 0.95 | 0.62 | 1.1 | 3.47 | 3 | 487.59 |
| | Inside | | | | | | | 44 | 3.8 | 2.48 | 4.4 | 13.88 | 12 | NA |
| 3 | Outside | | | 5.5 | | | | 5.5 | 0.95 | 0.62 | 1.1 | 3.47 | 3 | 437.59 |
| | Inside | | | | | | | 44 | 3.8 | 2.48 | 4.4 | 13.88 | 12 | NA |
| Comparative Example A | Outside | | | | 5.5 | | | 5.5 | 0.95 | 0.62 | 1.1 | 3.47 | 3 | 261.34 |
| | Inside | | | | | | | 44 | 3.8 | 2.48 | 4.4 | 13.88 | 12 | NA |
| Comparative Example B | Outside | | | | | 5.5 | | 5.5 | 0.95 | 0.62 | 1.1 | 3.47 | 3 | 173.48 |
| | Inside | | | | | | | 44 | 3.8 | 2.48 | 4.4 | 13.88 | 12 | NA |
| Comparative. Example C | Outside | | | | | | 5.5 | 5.5 | 0.95 | 0.62 | 1.1 | 3.47 | 3 | 325.33 |
| | Inside | | | | | | | 44 | 3.8 | 2.48 | 4.4 | 13.88 | 12 | NA |
| Comparative Example D | | | | | | | | 55 | 4.76 | 3.14 | 5.5 | 17.25 | 15.1 | 168.3 |

Examples 4-5 and Comparative Example E

Cut off wheels of Examples 4-5 and Comparative Example E were constructed to demonstrate the effects of incorporating particles of various geometries into 4-inch (105 mm) cut off wheels.

For Example 4, 5.5 parts of AP1, 5.5 parts of SAP4, 0.95 parts of AP2 and 0.62 parts of AP3 were mixed with 1.1 parts of PR1. Meanwhile 3.47 parts of PR2, 3.0 parts of CRY were Example 5 and Comparative Example E were prepared identically to Example 4, except for the composition changes as shown in Table 4.

Comparative test results are shown in Table 4 (below) for average time per cut and number of cuts achieved before the wheel was consumed.

TABLE 4

| EXAMPLE | ABRASIVE PARTICLES, pbw | | | | | | PR1, pbw | PR2, pbw | CRY, pbw | CUT TIME, seconds | NUMBER OF CUTS |
|---|---|---|---|---|---|---|---|---|---|---|---|
| | AP1 | AP2 | AP3 | AP4 | SAP4 | SAP5 | | | | | |
| 4 | 5.5 | 0.95 | 0.62 | | 5.5 | | 1.1 | 3.47 | 3.0 | 9.8 | 21 |
| 5 | 5.5 | 0.95 | 0.62 | | | 5.5 | 1.1 | 3.47 | 3.0 | 8.77 | 31 |
| Comparative Example E | 5.5 | 0.95 | 0.62 | 5.5 | | | 1.1 | 3.47 | 3.0 | 9.16 | 12.5 | mixed together. The dry powder mixture was slowly added to the wet mixture of resin and abrasive particles. A 4-inch (105-mm) diameter glass fiber scrim (SM) obtained as 3321 from Industrial Polymers & Chemicals of Shrewsbury, Mass.) was placed into the mold of a hydraulic press machine. 20 g mineral/resin mix were placed into the mold of a hydraulic press machine, on top of the scrim. A second scrim was placed on top of the mix composition, and pressed in a single cavity mold at a pressure of 20 tons/12.27 inch$^2$ (230 kg/cm$^2$). The cut-off wheels were then placed between metal plates, separated by TEFLON coated sheets, and placed in a curing oven. After a curing cycle of about 40

All patents and publications referred to herein are hereby incorporated by reference in their entirety. All examples given herein are to be considered non-limiting unless otherwise indicated. Various modifications and alterations of this disclosure may be made by those skilled in the art without departing from the scope and spirit of this disclosure, and it should be understood that this disclosure is not to be unduly limited to the illustrative embodiments set forth herein.

What is claimed is:

1. An abrasive article comprising ceramic shaped abrasive particles retained in a binder, wherein the ceramic shaped abrasive particles have four major sides joined by six common edges, wherein each one of the four major sides contacts three other of the four major sides, wherein all of the four major sides are concave, and wherein the six common edges have substantially the same length, and wherein the abrasive article comprises a bonded abrasive wheel.

2. The abrasive article of claim 1, wherein the ceramic shaped abrasive particles comprise sol-gel derived alumina.

3. The abrasive article of claim 1, wherein ceramic shaped abrasive particles comprise alpha alumina.

4. The abrasive article of claim 1, wherein the ceramic shaped abrasive particles have a coating of inorganic particles thereon.

5. The abrasive article of claim 1, wherein the binder comprises an organic binder.

6. The abrasive article of claim 1, wherein the binder comprises a phenolic resin.

7. The abrasive article of claim 1, wherein the binder comprises a vitreous binder.

8. The abrasive article of claim 1, wherein the grinding wheel comprises a depressed-center grinding wheel.

9. The abrasive article of claim 1, wherein the bonded abrasive wheel comprises a cut off wheel.

10. The abrasive article of claim 1, further comprising reinforcing material disposed on opposed major surfaces of the bonded abrasive wheel.

11. The abrasive article of claim 1, further comprising reinforcing material disposed on only one major surface of the bonded abrasive wheel.

12. The abrasive article of claim 1, further comprising crushed abrasive particles conforming to an abrasives industry specified nominal grade.

13. A method of abrading a workpiece, the method comprising:

frictionally contacting at least a portion of ceramic shaped abrasive particles of an abrasive article with a surface of a workpiece, wherein the abrasive article comprises the ceramic shaped abrasive particles retained in a binder, wherein the ceramic shaped abrasive particles have four major sides joined by six common edges, wherein each one of the four major sides contacts three other of the four major sides, wherein all of the four major sides are concave, and wherein the six common edges have substantially the same length, and wherein the abrasive article comprises a bonded abrasive wheel; and moving at least one of the workpiece or the abrasive article to abrade at least a portion of the surface of the workpiece.

* * * * *

UNITED STATES PATENT AND TRADEMARK OFFICE
CERTIFICATE OF CORRECTION

PATENT NO. : 9,573,250 B2
APPLICATION NO. : 13/581844
DATED : February 21, 2017
INVENTOR(S) : Mark Schwabel It is certified that error appears in the above-identified patent and that said Letters Patent is hereby corrected as shown below:

On the Title Page

Page 2, Column 2 (Other Publications)
Line 6-7, delete "fo Trued Electropated" and insert -- of True Electroplated --, therefor.

In the Specification

Column 3
Line 45, delete "82a 83a," and insert -- 82a, 83a, --, therefor.
Line 62-63, delete "82b 83b," and insert -- 82b, 83b, --, therefor.

Column 4
Line 13, delete "82c 83c," and insert -- 82c, 83c, --, therefor.
Line 31, delete "82d 83d," and insert -- 82d, 83d, --, therefor.
Line 48, delete "82e 83e," and insert -- 82e, 83e, --, therefor.
Line 59, delete "and or" and insert -- and/or --, therefor.

Column 18
Line 31, delete "Matermini" and insert -- Maternini --, therefor.
Line 32-33, delete "Matermini" and insert -- Maternini --, therefor.

Column 21-22 (Table 3)
Line 16 (approx.), delete "Comparative." and insert -- Comparative --, therefor.

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*